United States Patent
Li et al.

(10) Patent No.: US 11,517,875 B1
(45) Date of Patent: Dec. 6, 2022

(54) MODIFIED SODIUM FLUORIDE ADSORBENT FOR SPECIAL PURPOSE, PREPARATION AND APPLICATION THEREOF

(71) Applicant: FUJIAN DEER TECHNOLOGY CO., LTD., Longyan (CN)

(72) Inventors: Xiang Ru Li, Longyan (CN); Jia Lei Li, Longyan (CN); Shi Hua Chen, Longyan (CN); Jian Zhong Yang, Longyan (CN)

(73) Assignee: FUJIAN DEER TECHNOLOGY CO., LTD., Longyan (CN)

( * ) Notice: Subject to any disclaimer, the term of this patent is extended or adjusted under 35 U.S.C. 154(b) by 0 days.

(21) Appl. No.: 17/827,818

(22) Filed: May 30, 2022

Related U.S. Application Data

(63) Continuation of application No. PCT/CN2022/076059, filed on Feb. 11, 2022.

(51) Int. Cl.
  *B01J 20/04* (2006.01)
  *B01J 20/30* (2006.01)
  *B01J 20/28* (2006.01)

(52) U.S. Cl.
  CPC ....... *B01J 20/046* (2013.01); *B01J 20/28016* (2013.01); *B01J 20/28059* (2013.01); *B01J 20/28071* (2013.01); *B01J 20/3078* (2013.01)

(58) Field of Classification Search
  CPC .... B01J 20/04; B01J 20/046; B01J 20/28016; B01J 20/28059; B01J 20/28071; B01J 20/3078
  USPC ......................................................... 502/400
  See application file for complete search history.

(56) References Cited

U.S. PATENT DOCUMENTS

2022/0219982 A1\* 7/2022 Matsui .................. B01J 27/128

\* cited by examiner

*Primary Examiner* — Edward M Johnson

(57) ABSTRACT

A method for preparing a modified sodium fluoride adsorbent includes the following steps: S1. producing spherical particles of $NiCl_{12}.6H_2O$ and porous NaF with a mass ratio of 1:3.0-3.5; S2. sintering the spherical particles in a vacuum environment at a temperature of 120-130° C. for 10-40 hours and at a temperature of 280-300° C. for 10-40 hours, respectively, to form an adsorbent intermediate with a $NiCl_2$—NaF framework, wherein, a vacuum degree is less than or equal to 500 pa; and S3. treating the adsorbent intermediate by fluorine-nitrogen mixtures with high purity to obtain the novel sodium fluoride adsorbent having $NiCl_2$—NaF framework. The modified sodium fluoride adsorbent can effectively separate chlorine trifluoride and hydrogen fluoride molecules, and the optimal adsorption rate of hydrogen fluoride is upgraded to more than 98%. While, the optimal adsorption rate of chlorine trifluoride is lowered down to around 3%.

5 Claims, 1 Drawing Sheet

MODIFIED SODIUM FLUORIDE ADSORBENT FOR SPECIAL PURPOSE, PREPARATION AND APPLICATION THEREOF

CROSS-REFERENCE TO RELATED PATENT APPLICATIONS

This application is a continuation-application of International Application No. PCT/CN2022/076059, with an international filing date of Feb. 11, 2022, the contents of all of which are hereby incorporated by reference.

TECHNICAL FIELD

The present disclosure relates to a novel modified sodium fluoride adsorbent for special purpose, preparation and application thereof.

BACKGROUND

Chlorine trifluoride ($ClF_3$) is easy to have chemical association with hydrogen fluoride (HF) and form aggregates, which makes it difficult to separate chlorine trifluoride with hydrogen fluoride by current methods. Researches have shown that conventional sodium fluoride exhibits strong stability when encountering both chlorine trifluoride and hydrogen fluoride. The conventional sodium fluoride can adsorb hydrogen fluoride with an adsorption rate, however, less than 90%, and can also adsorb chlorine trifluoride with an adsorption rate around 10%. Therefore, conventional sodium fluoride has the drawbacks of low adsorption rate of hydrogen fluoride and large loss of chlorine trifluoride, etc.

SUMMARY

The present disclosure provides a novel modified sodium fluoride adsorbent for special purpose, preparation and application thereof, which may effectively address the above problems.

The present disclosure is realized by the following solutions.

The present disclosure provides a method for preparing a novel modified sodium fluoride adsorbent for special purpose, which includes the following steps:

S1. producing spherical particles of $NiCl_2 \cdot 6H_2O$ and porous NaF with a mass ratio of 1:3.0-3.5;

S2. sintering the spherical particles in a vacuum environment at a temperature of 120-130° C. for 10-40 hours and at a temperature of 280-300° C. for 10-40 hours, respectively, to form an adsorbent intermediate with a $NiCl_2$—NaF framework, wherein, a vacuum degree is less than or equal to 500 pa; and S3. treating the adsorbent intermediate by fluorine-nitrogen mixtures with high purity.

According to another aspect of the present disclosure, a novel modified sodium fluoride adsorbent for special purpose is provided, and the novel modified sodium fluoride adsorbent for special purpose has the $NiCl_2$—NaF framework, a BET specific surface area greater than or equal to 2 $m^2 \cdot g^{-1}$, and a pore volume greater than or equal to 0.00015 $cm^3 \cdot g^{-1}$.

According to yet another aspect of the present disclosure, a novel modified sodium fluoride adsorbent for special purpose is provided, and the novel modified sodium fluoride adsorbent for special purpose is prepared by the above method.

According to yet another aspect of the present disclosure, an application of the novel modified sodium fluoride adsorbent for special purpose is provided, in which the novel modified sodium fluoride adsorbent for special purpose is used for a separation of chlorine trifluoride and hydrogen fluoride.

The present disclosure has the following advantages. To deal with the chemical association between chlorine trifluoride and hydrogen fluoride, the present disclosure proposes a novel modified sodium fluoride adsorbent for special purpose with a $NiCl_2$—NaF configuration and preparation method thereof. The modified sodium fluoride adsorbent may separate chlorine trifluoride with hydrogen fluoride and remove the impurity hydrogen fluoride, so as to improve the purity degree of chlorine trifluoride and satisfy application demands of chlorine trifluoride. The modified sodium fluoride adsorbent provided by the present disclosure can effectively separate chlorine trifluoride and hydrogen fluoride molecules, the optimal adsorption rate of hydrogen fluoride is upgraded to higher than 98%, and the optimal adsorption rate of chlorine trifluoride is lowered down to around 3%. In addition, the modified sodium fluoride adsorbent exhibits high activity and high adsorption capacity under various working conditions. Moreover, the modified sodium fluoride adsorbent may be produced by simple processes with low production cost, good economic benefits, and can be industrially produced.

BRIE DESCRIPTION OF DRAWINGS

In order to clearly illustrate the technical solutions used in the implementations of the present disclosure, the drawings that are related to the illustration of the implementations will be briefly introduced below. It should be understood that the following drawings only show parts of the embodiments of the present disclosure. Therefore, the drawings should not be regarded as a limit to the scope of the present disclosure. For those of ordinary skill in the art, other related drawings can be derived from these drawings without creative effort.

DETAILED DESCRIPTION OF THE EMBODIMENTS

Figure 1:
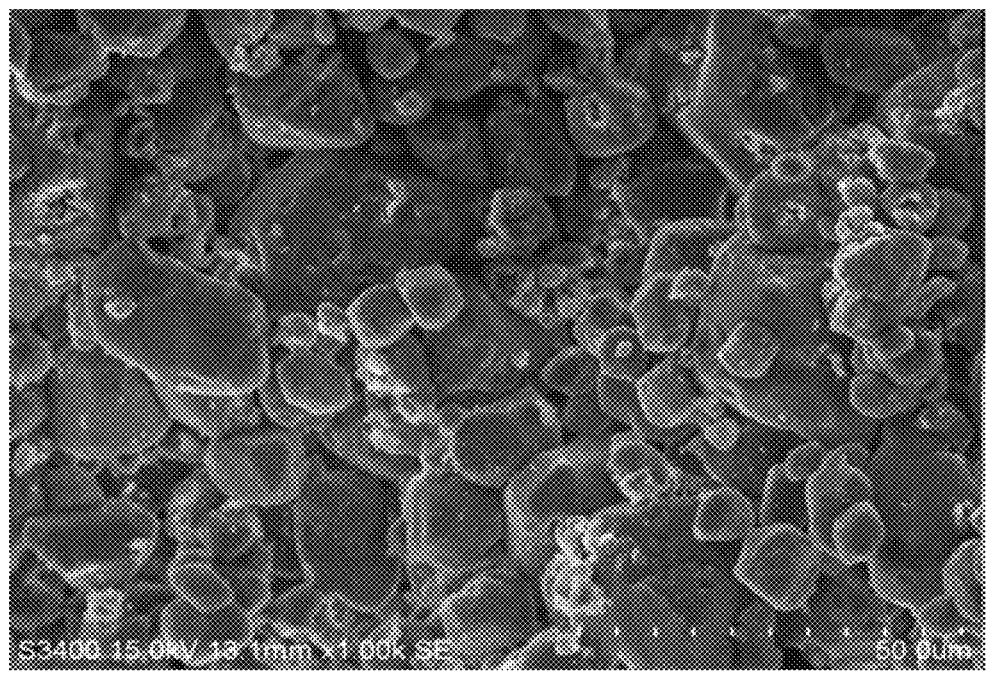
FIG. 1 shows a scanning electron microscope photograph of conventional sodium fluoride.

In order to make the objectives, technical solutions, and advantages of the embodiments of the present disclosure clearer, the technical solutions of the embodiments of the present disclosure will be described clearly and completely below with reference to the drawings of the embodiments of the present disclosure. Obviously, the described embodiments are parts of, rather than all of, the embodiments of the present disclosure. Based on the embodiments of the present disclosure, all other embodiments derived by those of ordinary skills in the art without creative effort fall within the scope of protection of the present disclosure. Accordingly, the following detailed description of the embodiments of the present disclosure shown in the drawings is not intended to limit the scope of protection of the present disclosure, but merely to represent selected embodiments of the present disclosure. Based on the embodiments of the present disclosure, all other embodiments derived by those of ordinary skills in the art without creative effort fall within the scope of protection of the present disclosure.

In the description of the present disclosure, the terms "first", "second" are used only for descriptive purposes and cannot be understood as indicating or implying relative importance or implying the quantity of indicated technical features. Thus, an element that is referred to by "first" and "second" may include, expressly or implicitly, one or more of the element. Also, in the description of the present disclosure, the phrase "a plurality of" refers to two or more elements, unless otherwise specified.

According to an embodiment of the present disclosure, a method for preparing a novel modified sodium fluoride adsorbent for special purpose is provided, which includes the following steps:

S1. producing spherical particles of $NiCl_2 \cdot 6H_2O$ and porous NaF with a mass ratio of 1:3.0-3.5;

S2. sintering the spherical particles in a vacuum environment at a temperature of 120-130° C. for 10-40 hours and at a temperature of 280-300° C. for 10-40 hours, respectively, to form an adsorbent intermediate with a $NiCl_2$—NaF framework, wherein, a vacuum degree is less than or equal to 500 pa; and S3. treating the adsorbent intermediate by fluorine-nitrogen mixtures with high purity.

As a further improvement, in step S1, test result shows that a well-controlled mass ratio of $NiCl_2 \cdot 6H_2O$ and porous NaF is favorable for ensuring a sufficient interaction between $NiF_2$, a resultant formed after $NiCl_2$ is fluorinated, and NaF, so as to minimize the adsorption of chlorine trifluoride. Therefore, preferably, spherical particles of $NiCl_2 \cdot 6H_2O$ and porous NaF are produced in a mass ratio of 1:3.1-3.3. In one embodiment, spherical particles of $NiCl_2 \cdot 6H_2O$ and porous NaF are produced in a mass ratio of 1:3.2.

The porous NaF may be prepared by the following steps:

S11. treating $NaHF_2$ by a vacuum drying process to let at least part of hydrogen atoms escape from the $NaHF_2$ molecule and form a loose and porous substance having properties of sodium fluoride; wherein, the drying temperature ranges 200-210° C., the drying time ranges 20-30 h, and vacuum degree is less than or equal to 500 pa. According to one embodiment, the drying temperature is about 205° C., the drying time is about 24 h, and the vacuum degree is about 100 pa.

As a further improvement, in step S1, particle sizes of the spherical particles range 5-8 mm, which is favorable for the packing of adsorption towers to obtain larger porosity. As a further improvement, $NiCl_2$ may undergo further treatment to form a polyfluorinated substance and nickel fluoride with a higher fluorine content.

As a further improvement, in step S2, sintering in a stepped manner may prevent cracking of the spherical particles which may happen due to a sudden rise of temperature, thereby improving the yield of sintered products, and the specific surface area and pore volume of the sintered adsorbent particles are increased several times. Furthermore, thanks to the stepped sintering, the water molecules of $NiCl_2 \cdot 6H_2O$ and part of the H atoms carried by $NaHF_2$ may be set free to form a loose and porous particle structure. In one embodiment, the spherical particles are sintered at a temperature of 125° C. for 24 hours and at a temperature of 290° C. for 24 hours, respectively. The vacuum degree is about 100 pa, the final BET specific surface area can reach 4.0756 $m^2 \cdot g^{-1}$, and the pore volume can reach 0.000301 $cm^3 \cdot g^{-1}$. In another embodiment, the spherical particles are sintered in a vacuum environment at a temperature of 130° C. for 24 hours and at a temperature of 280° C. for 24 hours, respectively. The vacuum degree is about 100 pa, the final BET specific surface area can reach 4.8995 $m^2 \cdot g^{-1}$, and the pore volume can reach 0.000356 $cm^3 \cdot g^{-1}$. In yet another embodiment, the spherical particles are sintered in a vacuum environment at a temperature of 120° C. for 24 hours and at a temperature of 300° C. for 24 hours, respectively. The vacuum degree is about 100 pa, the final BET specific surface area can reach 3.9781 $m^2 \cdot g^{-1}$, and the pore volume can reach 0.000293 $cm^3 \cdot g^{-1}$.

As a further improvement, in step S3, the use of fluorine-nitrogen mixtures with high purity aims to let nickel chloride react with fluorine gas to form nickel fluoride. Nickel fluoride with higher fluorine content (in each molecule, one nickel atom combines two fluorine atoms) is introduced into sodium fluoride, and through the interaction between sodium fluoride molecules and nickel difluoride molecules, "molecules" of polyfluorine groups with a three-dimensional configuration similar to that of chlorine trifluoride are formed, while the bond length and bond angle with the chlorine trifluoride molecules are twisted and broken to certain extent, so as to achieve the purpose of separating sodium fluoride molecules and chlorine trifluoride molecules. The "molecules" of polyfluorine groups, when interacting with hydrogen fluoride molecules, are more likely to form weak intermolecular forces. By controlling the temperature of the mixture system, the formation of high polymers of hydrogen fluoride molecules is reduced, and the bimolecular association of chlorine trifluoride molecules is suppressed as well. Additionally, the repulsive force between these molecules with higher mobility and the "modified" sodium fluoride molecules also increases simultaneously, so that the "modified" sodium fluoride can reduce the adsorption rate of chlorine trifluoride and improve the adsorption rate of hydrogen fluoride. Nitrogen plays the role of diluting fluorine gas, preventing the potential risks that may occur due to the strong activity of fluorine gas. Tests have shown that fluorine gas is inactive with low concentration and would become risky with high concentration. Therefore, preferably, the fluorine-nitrogen mixtures with high purity may contain $F_2$ with a volume fraction of 5-15% and $N_2$ with a volume fraction of 85-95%. In one embodiment, the fluorine-nitrogen mixtures contain $F_2$ with a volume fraction of 10% and $N_2$ with a volume fraction of 90%.

As a further improvement, in step S3, the step of treating the adsorbent intermediate by fluorine-nitrogen mixtures with high purity includes:

fluorinating the adsorbent intermediate by the fluorine-nitrogen mixtures with high purity for 24-72 hours. In one embodiment, the adsorbent intermediate is fluorinated with the fluorine-nitrogen mixtures with high purity for 48 hours, and after the fluorination is completed, nitrogen purge is performed to remove the fluorine-nitrogen mixtures with high purity.

According to another aspect of the present disclosure, a novel modified sodium fluoride adsorbent for special purpose is provided. The novel modified sodium fluoride adsorbent has a $NiCl_2$—NaF framework, a BET specific surface area greater than or equal to 2 $m^2 \cdot g^{-1}$, and a pore volume greater than or equal to 0.00015 $cm^3 \cdot g^{-1}$. In one embodiment, the BET specific surface area of the novel modified sodium fluoride adsorbent can reach 4.8995 $m^2 \cdot g^{-1}$, and the pore volume can reach 0.000356 $cm^3 \cdot g^{-1}$.

Figure 2:
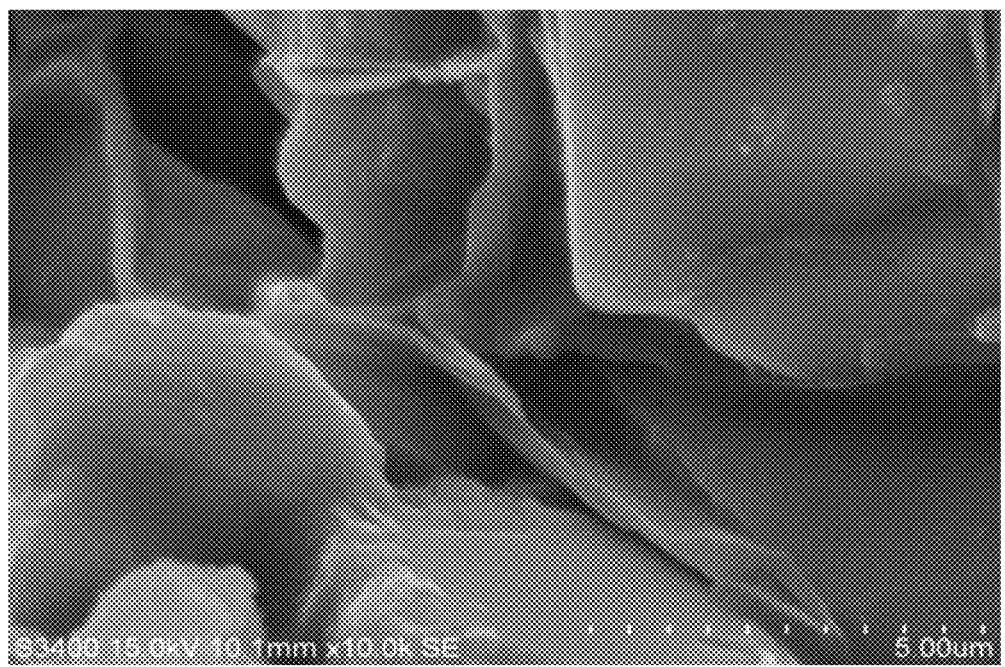
FIG. 2 shows a scanning electron microscope photograph of a novel modified sodium fluoride adsorbent for special purpose according to an embodiment of the present disclosure.

Referring to FIGS. 1-2, the conventional sodium fluoride has a compact arrangement of crystals with a small specific surface area, which is unfavorable for an effective adsorption of hydrogen fluoride (conventional sodium fluoride has a BET specific surface area as low as 0.6591 $m^2 \cdot g^{-1}$ and a pore volume as low as 0.000054 $cm^3 \cdot g^{-1}$). The novel modified sodium fluoride adsorbent for special purpose has a sheet-like structure with larger specific surface area, and the number of pores is also increased compared with the conventional sodium fluoride, which can effectively improve the adsorption rate of hydrogen fluoride.

According to yet another embodiment of the present disclosure, an application of the above-mentioned novel modified sodium fluoride adsorbent for special purpose is provided, in which the modified sodium fluoride adsorbent is used for the separation of chlorine trifluoride and hydrogen fluoride.

In the present disclosure, orthogonal tests with the following processing conditions are performed to separate chlorine trifluoride with hydrogen fluoride:

TABLE 1

Orthogonal test factors

| | test factors | | |
|---|---|---|---|
| level | temperature (° C.) A | pressure (MPa) B | flow rate (L/min) C |
| 1 | 20 | 0.2 | 0.2 |
| 2 | 40 | 0.4 | 0.4 |
| 3 | 60 | 0.6 | 0.6 |
| 4 | 80 | 0.8 | 0.8 |
| 5 | 100 | 1.0 | 1.0 |

TABLE 2

Results of the orthogonal tests

| Number | Temperature ° C. | Pressure MPa | Flow rate L/min | Components before adsorption | Components after adsorption | Flow rate after adsorption L/min | HF adsorption rate % | $ClF_3$ adsorption rate % |
|---|---|---|---|---|---|---|---|---|
| 1 | 20 | 0.2 | 0.2 | 0.832$ClF_3$ 0.023HF 0.145 others | 0.8419$ClF_3$ 0.0079HF 0.1502 others | 0.19309 | 66.65 | 2.31 |
| 2 | 20 | 0.4 | 0.4 | 0.833$ClF_3$ 0.022HF 0.145 others | 0.8422$ClF_3$ 0.0079HF 0.1499 others | 0.386988 | 65.33 | 2.18 |
| 3 | 20 | 0.6 | 0.6 | 0.833$ClF_3$ 0.024HF 0.143 others | 0.8434$ClF_3$ 0.0087HF 0.1479 others | 0.580135 | 60.45 | 2.10 |
| 4 | 20 | 0.8 | 0.8 | 0.831$ClF_3$ 0.022HF 0.147 others | 0.8391$ClF_3$ 0.0096HF 0.1513 others | 0.777162 | 57.62 | 1.91 |
| 5 | 20 | 1.0 | 1.0 | 0.830$ClF_3$ 0.024HF 0.146 others | 0.8383ClF3 0.0115HF 0.1502 others | 0.972359 | 53.27 | 1.79 |
| 6 | 40 | 0.2 | 0.4 | 0.832$ClF_3$ 0.022HF 0.146 others | 0.8423$ClF_3$ 0.0063HF 0.1514 others | 0.385958 | 69.50 | 2.31 |
| 7 | 40 | 0.4 | 0.6 | 0.834$ClF_3$ 0.023HF 0.143 others | 0.8443$ClF_3$ 0.0075HF 0.1482 others | 0.579198 | 68.42 | 2.27 |
| 8 | 40 | 0.6 | 0.8 | 0.833$ClF_3$ 0.022HF 0.145 others | 0.8422$ClF_3$0. 0079HF 0.1499 others | 0.773832 | 65.38 | 2.20 |
| 9 | 40 | 0.8 | 1.0 | 0.834$ClF_3$ 0.025HF 0.141 others | 0.8446$ClF_3$ 0.0095HF 0.1459 others | 0.966501 | 63.27 | 2.12 |
| 10 | 40 | 1.0 | 0.2 | 0.835$ClF_3$0.0 24HF 0.141 others | 0.8475$ClF_3$ 0.0058HF 0.1467 others | 0.192168 | 76.88 | 2.48 |
| 11 | 60 | 0.2 | 0.6 | 0.832$ClF_3$ 0.023HF 0.145 others | 0.8445$ClF_3$ 0.0043HF 0.1512 others | 0.575226 | 82.21 | 2.69 |
| 12 | 60 | 0.4 | 0.8 | 0.833$ClF_3$ 0.025HF 0.142 others | 0.8464$ClF_3$ 0.0054HF 0.1482 others | 0.76667 | 79.35 | 2.62 |
| 13 | 60 | 0.6 | 1.0 | 0.835$ClF_3$ 0.021HF 0.144 others | 0.8454$ClF_3$ 0.0049HF 0.1497 others | 0.962229 | 77.28 | 2.58 |
| 14 | 60 | 0.8 | 0.2 | 0.833$ClF_3$ 0.026HF 0.141 others | 0.8491$ClF_3$ 0.0031HF 0.1478 others | 0.190794 | 88.62 | 2.76 |
| 15 | 60 | 1.0 | 0.4 | 0.834$ClF_3$ 0.026HF 0.140 others | 0.8497$ClF_3$ 0.0037HF 0.1466 others | 0.381927 | 86.53 | 2.72 |
| 16 | 80 | 0.2 | 0.8 | 0.833$ClF_3$ 0.021HF 0.146 others | 0.8449$ClF_3$ 0.0027HF 0.1604 others | 0.766867 | 87.34 | 2.77 |
| 17 | 80 | 0.4 | 1.0 | 0.833$ClF_3$ 0.022HF 0.145 others | 0.8454ClF3 0.0033HF 0.1513 others | 0.958638 | 85.40 | 2.71 |

TABLE 2-continued

Results of the orthogonal tests

| Number | Temperature °C. | Pressure MPa | Flow rate L/min | Components before adsorption | Components after adsorption | Flow rate after adsorption L/min | HF adsorption rate % | $ClF_3$ adsorption rate % |
|---|---|---|---|---|---|---|---|---|
| 18 | 80 | 0.6 | 0.2 | 0.831$ClF_3$ 0.023HF 0.146 others | 0.8455$ClF_3$ 0.0015HF 0.1503 others | 0.1908 | 93.61 | 2.91 |
| 19 | 80 | 0.8 | 0.4 | 0.831$ClF_3$ 0.024HF 0.145 others | 0.8460$ClF_3$ 0.0021HF 0.1519 others | 0.38165 | 91.78 | 2.87 |
| 20 | 80 | 1.0 | 0.6 | 0.832$ClF_3$ 0.021HF 0.147 others | 0.8443$ClF_3$ 0.0022HF 0.1535 others | 0.574513 | 90.15 | 2.83 |
| 21 | 100 | 0.2 | 1.0 | 0.832$ClF_3$ 0.023HF 0.145 others | 0.0.8443$ClF_3$ 0.0022HF 0.1535 others | 0.957522 | 90.81 | 2.93 |
| 22 | 100 | 0.4 | 0.2 | 0.833$ClF_3$ 0.022HF 0.145 others | 0.8474$ClF_3$ 0.0005HF 0.1521 others | 0.19064 | 98.01 | 3.03 |
| 23 | 100 | 0.6 | 0.4 | 0.831$ClF_3$ 0.026HF 0.143 others | 0.8485$ClF_3$ 0.0010HF 0.1505 others | 0.380001 | 96.42 | 3.00 |
| 24 | 100 | 0.8 | 0.6 | 0.831$ClF_3$ 0.027HF 0.142 others | 0.8489$ClF_3$ 0.0015HF 0.1496 others | 0.569819 | 94.58 | 2.98 |
| 25 | 100 | 1.0 | 0.8 | 0.833$ClF_3$ 0.023HF 0.144 others | 0.8474$ClF_3$ 0.0016HF 0.1510 others | 0.763089 | 93.04 | 2.97 |
| K1 average | 60.66 | 79.30 | 84.80 | | | | | |
| K2 average | 68.69 | 79.31 | 80.94 | | | | | |
| K3 average | 82.80 | 78.63 | 79.16 | | | | | |
| K4 average | 89.66 | 79.17 | 76.55 | | | | | |
| K5 average | 94.57 | 79.97 | 74.01 | | | | | |
| Range (R) | 33.91 | 1.34 | 10.79 | | | | | |
| Priorities | | | | A > C > B | | | | |
| Excellent level | A5 | B5 | C1 | | | | | |
| Excellent combination | | | | A5B4C1, refers to optimal process conditions: temperature 100° C., pressure 1.0 MPa, flow rate 0.2 L/min | | | | |

According to table 2 presented above, the novel modified sodium fluoride adsorbent for special purpose provided by the present disclosure can effectively separate chlorine trifluoride and hydrogen fluoride molecules, and the optimal adsorption rate of hydrogen fluoride is upgraded to more than 98%. While, the optimal adsorption rate of chlorine trifluoride is lowered down to around 3%. Additionally, the novel modified sodium fluoride adsorbent exhibits high activity and high adsorption capacity under various working conditions. Moreover, the modified sodium fluoride adsorbent may be produced by simple processes with low production cost, good economic benefits, and can be industrially produced. Lastly, the modified sodium fluoride adsorbent has a long service life. Tests show that the optimal adsorption rate of hydrogen fluoride can still be maintained at around 98%, and the best adsorption rate of chlorine trifluoride can still be maintained at around 3%, after the modified sodium fluoride adsorbent is reused in 100 tests.

The described embodiments are only the preferable embodiments of the present disclosure, which do not limit the present disclosure. Without departing from the spirit and principle of the present disclosure, the present disclosure may have various modifications and changes to those of ordinary skill in the art, and any changes, equivalent substitutions, and improvements derived from the present disclosure should be considered as falling within the scope of the present disclosure.

What is claimed is:
1. A method for preparing a modified sodium fluoride adsorbent, comprising the following steps:
S1. producing spherical particles of $NiCl_2.6H_2O$ and porous NaF with a mass ratio of 1:3.0-3.5;
S2. sintering the spherical particles in a vacuum environment at a temperature of 120-130° C. for 10-40 hours and at a temperature of 280-300° C. for 10-40 hours, respectively, to form an adsorbent intermediate with a $NiCl_2$—NaF framework, wherein, a vacuum degree is less than or equal to 500 pa; and
S3. treating the adsorbent intermediate by fluorine-nitrogen mixtures with high purity.
2. The method for preparing a modified sodium fluoride adsorbent according to claim 1, wherein a preparation of the porous NaF in step S1 comprises:
S11. treating $NaHF_2$ by a vacuum drying process to form a loose and porous substance having properties of sodium fluoride; wherein, a drying temperature ranges 200-210° C., a drying time ranges 20-30 h, and a vacuum degree is less than or equal to 500 pa.

3. The method for preparing modified sodium fluoride adsorbent according to claim 1, wherein in step S1, particle sizes of the spherical particles range 5-8 mm.

4. The method for preparing a modified sodium fluoride adsorbent according to claim 1, wherein in step S3, the fluorine-nitrogen mixtures with high purity contain $F_2$ with a volume fraction of 5-.15% and $N_2$ with a volume fraction of 85-95%.

5. The method for preparing a modified sodium fluoride adsorbent according to claim 1, wherein in step S3, the step of treating the adsorbent intermediate by the fluorine-nitrogen mixtures with high purity comprises:

fluorinating the adsorbent intermediate by the fluorine-nitrogen mixtures with high purity for 24-72 hours.

\* \* \* \* \*